(12) United States Patent
Lieb et al.

(10) Patent No.: US 9,294,547 B2
(45) Date of Patent: Mar. 22, 2016

(54) MOBILE DEVICE APPLICATION FOR ACCESSING A PRESENTATION UPLOADED TO A PRESENTATION SERVER AND PRESENTING A PRESENTATION OFFLINE

(71) Applicant: Clearslide, Inc., San Francisco, CA (US)

(72) Inventors: Adam Michael Lieb, San Francisco, CA (US); Stefano Acerbetti, San Francisco, CA (US)

(73) Assignee: CLEARSLIDE, INC., San Francisco, CA (US)

( * ) Notice: Subject to any disclaimer, the term of this patent is extended or adjusted under 35 U.S.C. 154(b) by 169 days.

(21) Appl. No.: 13/802,222

(22) Filed: Mar. 13, 2013

(65) Prior Publication Data
US 2014/0164929 A1  Jun. 12, 2014

Related U.S. Application Data

(60) Provisional application No. 61/736,505, filed on Dec. 12, 2012.

(51) Int. Cl.
| | |
|---|---|
| *H04L 29/08* | (2006.01) |
| *G06F 3/0484* | (2013.01) |
| *G06F 17/30* | (2006.01) |
| *G06F 3/0482* | (2013.01) |
| *G06F 3/0488* | (2013.01) |

(52) U.S. Cl.
CPC .............. *H04L 67/06* (2013.01); *G06F 3/0482* (2013.01); *G06F 3/0484* (2013.01); *G06F 3/04883* (2013.01); *G06F 17/30056* (2013.01); *H04L 67/22* (2013.01); *H04L 67/04* (2013.01)

(58) Field of Classification Search
CPC .......................... H04L 67/06; G06F 17/30056
USPC ........................................................ 715/730
See application file for complete search history.

(56) References Cited

U.S. PATENT DOCUMENTS

| | | | | |
|---|---|---|---|---|
| 2006/0156240 | A1* | 7/2006 | Lemay et al. | 715/730 |
| 2006/0294468 | A1* | 12/2006 | Sareen et al. | 715/730 |
| 2007/0239725 | A1* | 10/2007 | Bhat et al. | 707/10 |

(Continued)

FOREIGN PATENT DOCUMENTS

| | | |
|---|---|---|
| JP | 2007053566 A | 3/2007 |
| WO | 2012148683 A2 | 11/2012 |
| WO | 2012166827 A9 | 12/2012 |

OTHER PUBLICATIONS

International Search Report and Written Opinion mailed Apr. 18, 2014, for International Application No. PCT/2013/074418, 7 pages.

*Primary Examiner* — Ryan Pitaro
*Assistant Examiner* — David Luu
(74) *Attorney, Agent, or Firm* — Perkins Coie LLP

(57) ABSTRACT

A mobile device application is described that runs on a mobile device and allows a user to log in to the user's account on a presentation server. The user can download previously stored presentations to the local memory of the mobile device to make an in-person offline presentation from the mobile device. While the user is making the presentation, the mobile device application tracks analytic data pertaining to the slide presentation, such as how long each slide is open and viewed. This analytic data is uploaded to the server when an internet connection is available for integration with other data tracked for the presentation.

15 Claims, 14 Drawing Sheets

(56) References Cited

U.S. PATENT DOCUMENTS

| | | | |
|---|---|---|---|
| 2009/0119062 A1* | 5/2009 | Owens | G06Q 10/10 702/176 |
| 2010/0218100 A1 | 8/2010 | Simon et al. | |
| 2010/0257456 A1* | 10/2010 | Lieb et al. | 715/741 |
| 2011/0246893 A1* | 10/2011 | Paas et al. | 715/732 |
| 2013/0013560 A1* | 1/2013 | Goldberg et al. | 707/634 |
| 2013/0226979 A1* | 8/2013 | Caruso et al. | 707/827 |
| 2013/0283213 A1* | 10/2013 | Guendelman et al. | 715/848 |
| 2013/0346843 A1* | 12/2013 | Murray et al. | 715/212 |

* cited by examiner

MOBILE DEVICE APPLICATION FOR ACCESSING A PRESENTATION UPLOADED TO A PRESENTATION SERVER AND PRESENTING A PRESENTATION OFFLINE

CROSS-REFERENCE TO RELATED APPLICATIONS

This application claims the benefit of the following application which is incorporated by reference in its entirety, U.S. Provisional Application No. 61/736,505, entitled "MOBILE DEVICE APPLICATION FOR ACCESSING A PRESENTATION UPLOADED TO A PRESENTATION SERVER AND PRESENTING PRESENTATION OFFLINE," filed Dec. 12, 2012.

BACKGROUND

A presenter can upload presentations to a presentation server for storage. Subsequently, the presenter can send a link to the presentation to a recipient for the recipient to view at any time. The presenter can also access the stored presentation for delivering a live presentation to an audience, either located in the same room or online over the Internet. The live presentation uses an Internet connection between the presenter's device and the presentation server, and between the viewers' devices and the presentation server.

DETAILED DESCRIPTION

A mobile device application is described that allows a user to log in to the user's account on a presentation server. The user can download previously stored presentations to the local memory of the mobile device to make an in-person offline presentation from the mobile device. While the user is making the presentation, the mobile device application tracks analytic data pertaining to the slide presentation, such as how long each slide is open and viewed. This analytic data is uploaded to the server when an internet connection is available.

Various aspects and examples of the invention will now be described. The following description provides specific details for a thorough understanding and enabling description of these examples. One skilled in the art will understand, however, that the invention may be practiced without many of these details. Additionally, some well-known structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the technology. Certain terms may even be emphasized below; however, any terminology intended to be interpreted in any restricted manner will be overtly and specifically defined as such in this Detailed Description section.

Figure 1A:
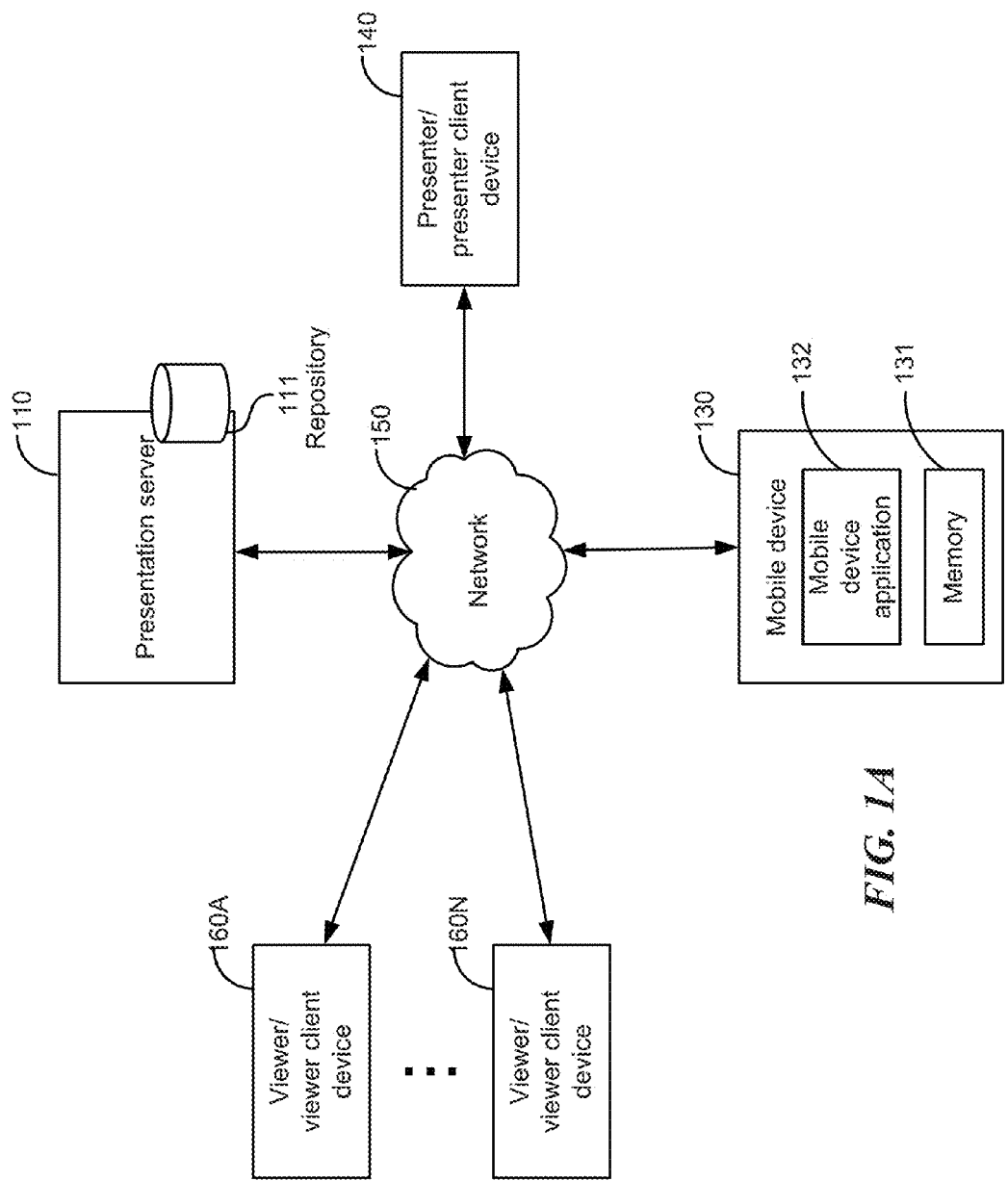
FIG. 1A shows a general environment where a presentation server provides delivery of a stored presentation over a network, such as the internet, using any one of various modes.

FIG. 1 shows a general environment where a presentation server 110 provides delivery of a stored presentation in a repository 111 over a network 150, such as the internet, using any one of various modes. A presenter 140 can upload a presentation to the presentation server 110 for storage, and then the presenter 140 or any viewer 160A, 160N can access the presentation over the network 150 from any client device that connects to an appropriate web link. The slides of the presentation deck can each embed different types of media including, but not limited to, a powerpoint slide, a live webpage, PDF documents, and videos. The presentation server is described in more detail in U.S. patent application Ser. No. 12/756,145 entitled, "Presentation Access Tracking System," and is incorporated herein in its entirety.

In one mode, the presenter 140 can send a web link to the presentation stored on the presentation server 110 to one or more recipients 160A, 160N for viewing whenever the recipients want. The presentation server 110 tracks data related to the recipients' access of the presentation including, but not limited to, when each recipient 160A, 160N views the presentation, how long each recipient 160A, 160N views each slide of the presentation, whether any of the recipients 160A, 160N forwarded the link to the presentation to other viewers, and to whom the link to the presentation was forwarded. Similarly, when subsequent viewers of the presentation access the presentation using the link, the presentation server 110 also tracks viewing data related to subsequent viewers.

In another mode, the presenter can make a live presentation to one or more viewers 160A, 160N remotely. The presenter 140 can access his presentation on the presentation server 110 and send a link for the live presentation to one or more viewers 160A, 160N. When those viewers 160A, 160N access the link using a client device, they can see the slides of the presentation as the presenter 140 selects each slide for display. Moreover, the presenter 140 is not limited to the slides from a single presentation. The presenter can select slides from different stored presentations for the live presentation. In the live presentation mode, the presentation server 110 can also track data related to the live pitch, similar to the tracked data for viewers independently viewing a presentation. The analytic data for each presentation, whether delivered as a live presentation or viewed by a viewer independently, is available to the presenter 140 to review through the presentation server 110.

In yet another mode, a mobile device application (MDA) 132 running on a mobile device 130, such as a tablet (e.g., an iPad) or smartphone (e.g., an iPhone), can download one or more stored presentations from the presentation server 110. The downloaded presentation can be used by the presenter to give an in-person presentation via the mobile device 130 without requiring an internet connection to the presentation server 110 during the presentation.

Figure 1B:
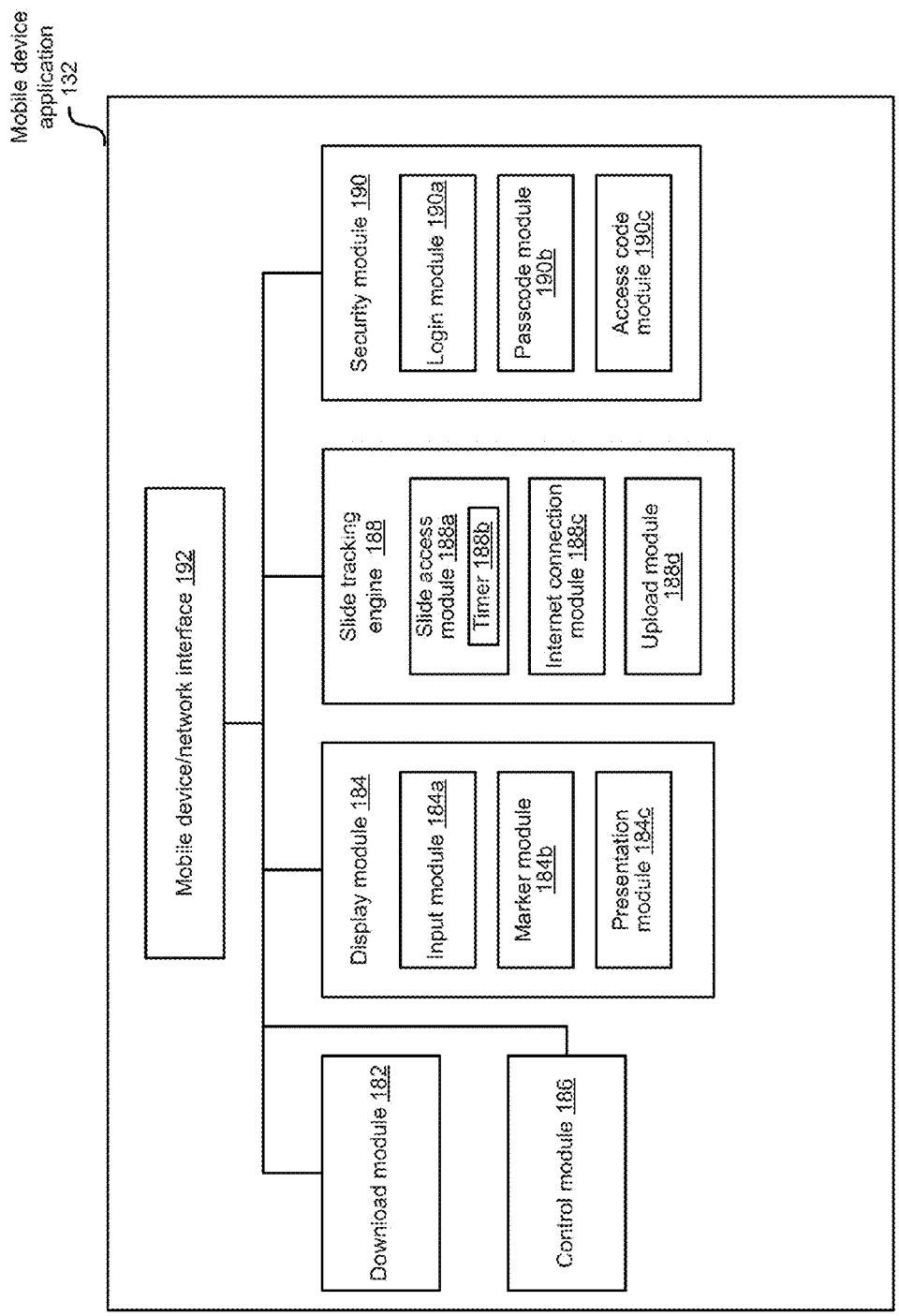
FIG. 1B shows a block diagram illustrating an example of components in a mobile device application.

FIG. 1B depicts a block diagram illustrating an example of components in the MDA 132 that support presenting of a presentation downloaded from the presentation server. The MDA 132 can include, for example, a mobile device/network interface 192, a download module 182, a control module 186, a display module 184, a slide tracking engine 188, and/or a security module 190. Additional or fewer components/modules/engines can be included in the MDA 132 and each illustrated component.

The mobile device/network interface 192 can be a module that enables the mobile device application 132 to mediate data in a network with an entity that is external to the mobile device application 132, through any known and/or convenient communications protocol supported by the host and the external entity, and/or to communicate with the mobile device 130, for example, receiving input data provided by a user, and sending display information to be shown on the mobile device screen or information to be sent over a network using a network interface in the mobile device 130. The mobile device/network interface 192 can include one or more of a network adaptor card, a wireless network interface card (e.g., SMS interface, WiFi interface, interfaces for various generations of mobile communication standards including but not limited to 1G, 2G, 3G, 3.5G, 4G, LTE, etc.,), Bluetooth, a router, an access point, a wireless router, a switch, a multilayer switch, a protocol converter, a gateway, a bridge, bridge router, a hub, a digital media receiver, and/or a repeater.

As used herein, a "module," "a manager," a "handler," a "detector," an "interface," or an "engine" includes a general purpose, dedicated or shared processor and, typically, firmware or software modules that are executed by the processor. Depending upon implementation-specific or other considerations, the module, manager, handler, or engine can be centralized or its functionality distributed. The module, manager, handler, or engine can include general or special purpose hardware, firmware, or software embodied in a computer-readable (storage) medium for execution by the processor. As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

One embodiment of the MDA 132 includes the security module 190 via which a user can log in to the presentation server 110 if the user has an account with the presentation server 110. The security module 190 can include a login module 190a, a passcode module 190b, and/or an access code module 190c.

The passcode module 190b stores a passcode that must be entered by a user before being allowed to access the MDA 132. The passcode module 190b requests and verifies the passcode entered by the user.

Figure 2:
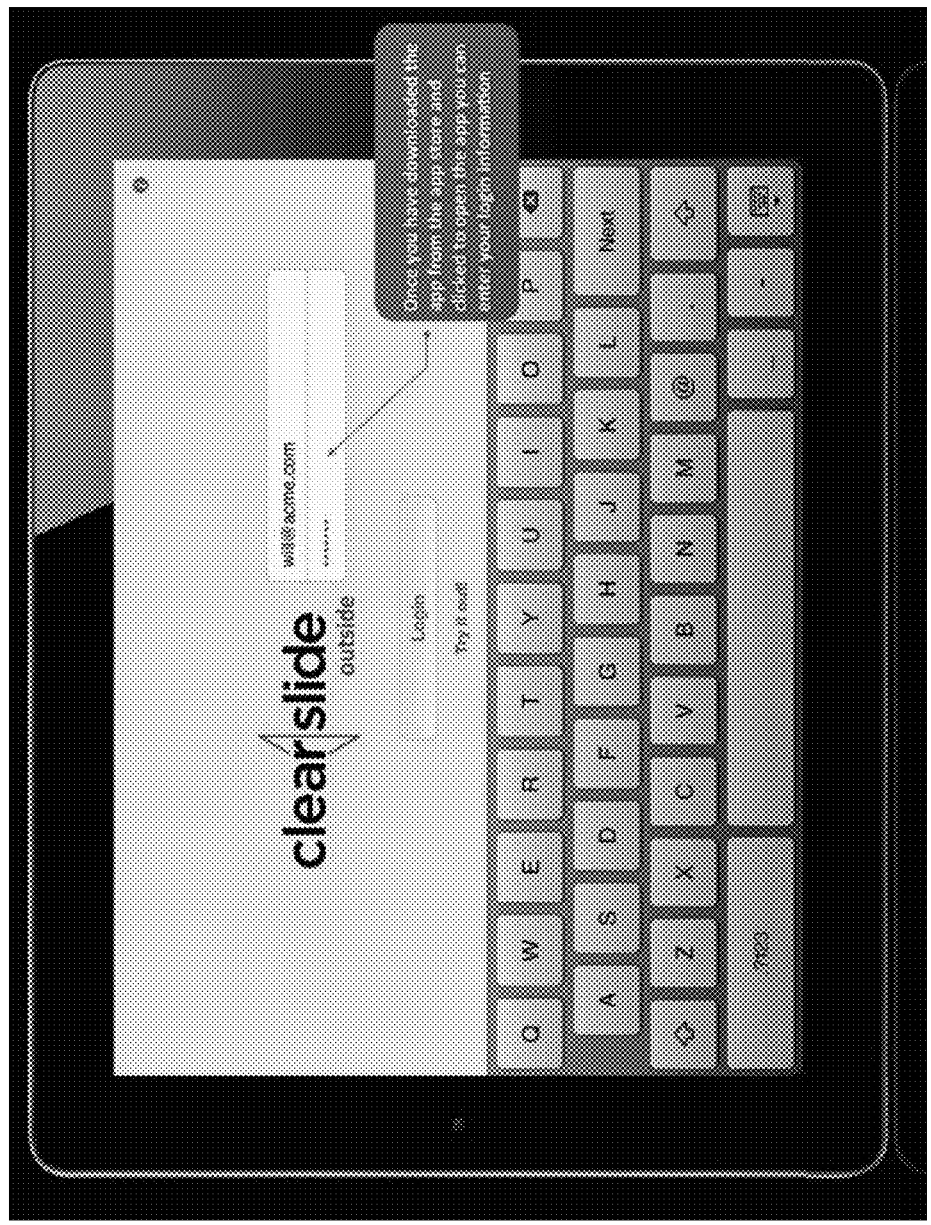
FIG. 2 shows an example screen shot of the log in screen.

The user logs in to the presentation server 110 by entering a username and password via the login module 190a. FIG. 2 shows an example screen shot of the log in screen. The login module 190a sends the log in information to the presentation server 110, and upon confirmation by the presentation server 110, the user can access presentations previously stored at the repository 111 of the presentation server 110 under the user's account.

Distinct from the passcode is an access code that is specific to a presentation. Even if a user enters the correct passcode to access the MDA 132, if the user does not know the access code for a presentation, access is denied to the corresponding presentation. The access code can be set by a presenter and stored at the mobile device via the access code module 190c. The access code module 190c requests and verifies the access code entered by the user.

Figure 3:
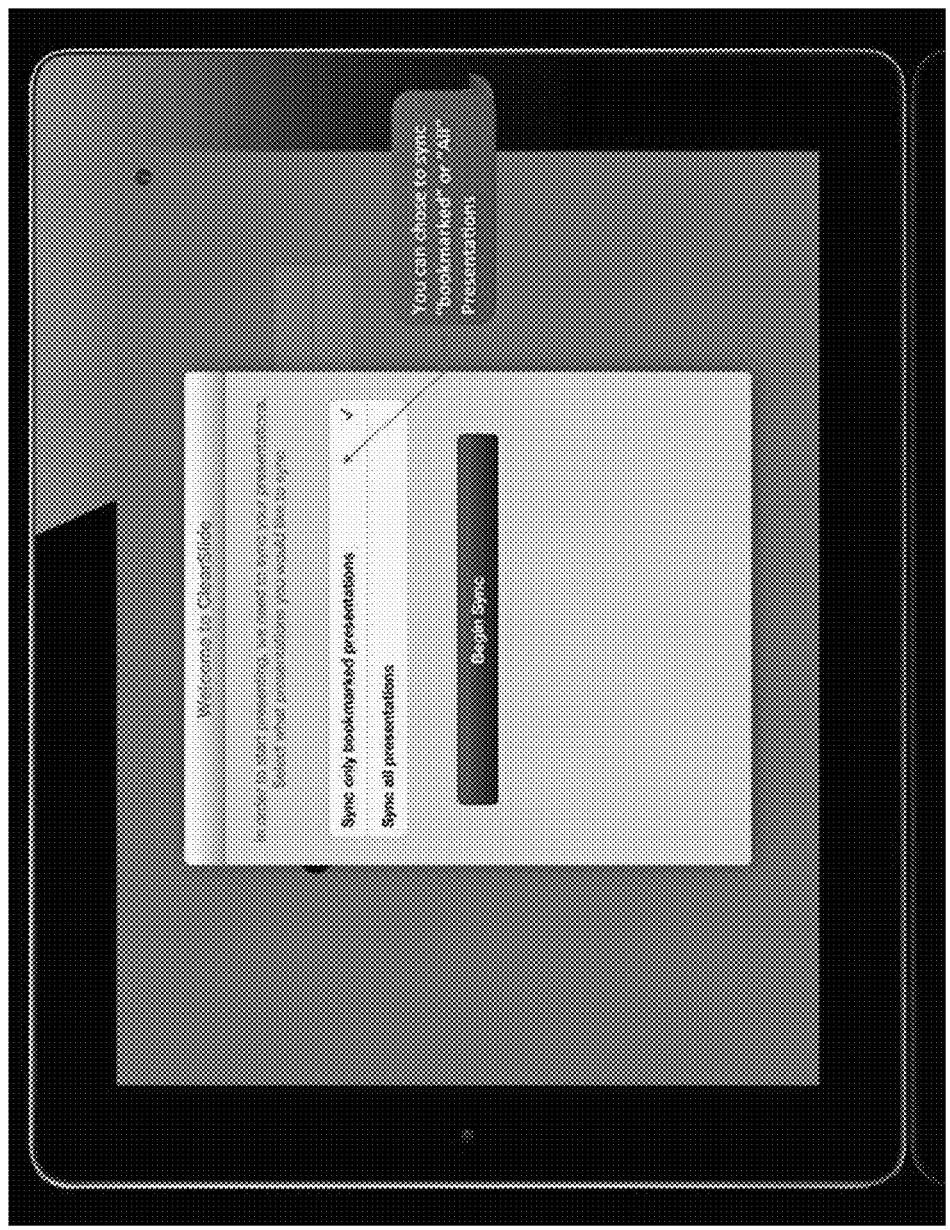
FIG. 3 shows an example screen shot of the presentation synchronization selection screen.

One embodiment of the MDA 132 includes the download module 182 which can download presentations from the presentation server 110 to the memory 131 of the mobile device 130. Once connected to the presentation server 110, the presenter can select from the presentations associated with the presenter's account which specific presentations to download. FIG. 3 shows an example screen shot of the presentation synchronization selection screen provided by the download module 182. With a first option, the presenter can select all of the available presentations for downloading to the mobile device 130. To save storage space on the mobile device 130 or to reduce the time it takes to synchronize stored presentations to the mobile device 130, the presenter has an option to select a subset of the available presentations (identified as "bookmarked presentations" in FIG. 3) for downloading to the mobile device 130. In some cases, the presenter may have downloaded a previous version of the presentation to the mobile device 130. Thus, rather than re-downloading the entire presentation again, the download module 182 simply synchronizes the previously downloaded version of a presentation with the latest stored version of the presentation at the presentation server 110. Then if the presenter makes changes to the presentation stored at the presentation server 110, the downloaded version is effectively synchronized with the changes stored at the presentation server 110.

One embodiment of the MDA 132 includes the display module 184 which displays a presentation and other presentation-related information to the presenter on the screen of the mobile device 130. The display module 184 can include an input module 184a, a marker module 184b, and/or a presentation module 184c.

Figure 4:
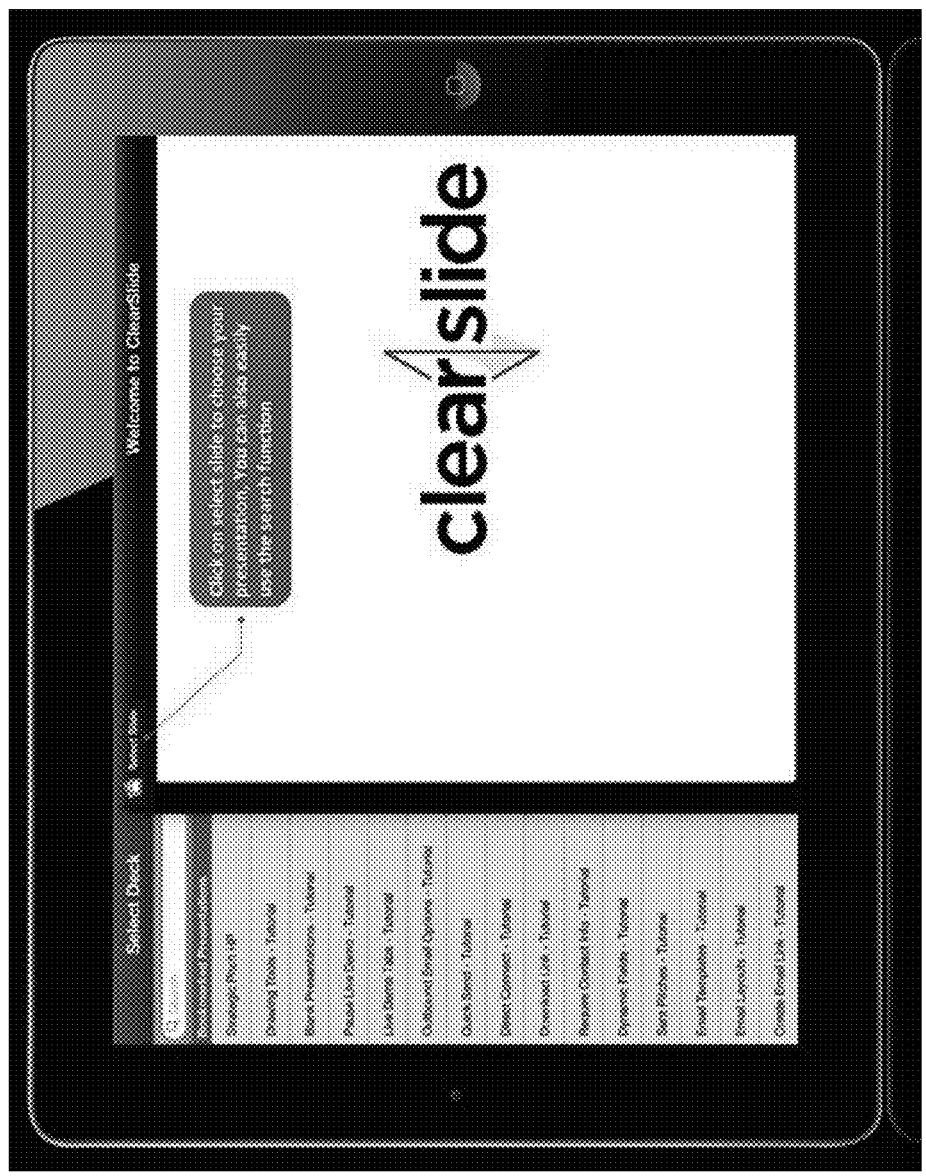
FIG. 4 shows an example screen shot of the presentation selection screen.

Once the presentations of interest have been downloaded to the mobile device 130, the presenter can make a presentation via the presentation module 184c without an internet connection. The presentation module 184c provides a presentation selection screen which shows the bookmarked presentations stored in memory at the mobile device 130 that are available to be accessed. FIG. 4 shows an example screen shot of the presentation selection screen. The downloaded presentations are listed on the left side of the screen for the presenter to choose from. Once the presenter selects a presentation deck, the presenter can select the 'select slide' button shown in FIG. 4 to bring up a screen for previewing slides from the selected presentation.

Figure 5:
FIG. 5 shows an example screen shot of the slide preview screen.

After a presentation has been selected by the presenter, the presentation module 184c allows the presenter to jump to any slide in a presentation or even to jump between presentations. FIG. 5 shows an example screen shot of the slide preview screen. The slides of the selected presentation are shown on the left side of the screen, and the presenter can select any slide for presentation.

The input module 184a receives touch screen input provided by the presenter through a touch screen of the mobile device 130. The mobile device 130 senses the presenter's touch and the location(s) of the touch(es) and sends the information to the input module 184a. Certain gestures are predefined and stored in memory, and when the presenter performs one of the predefined gestures, the input module 184a responds accordingly.

Figure 6:
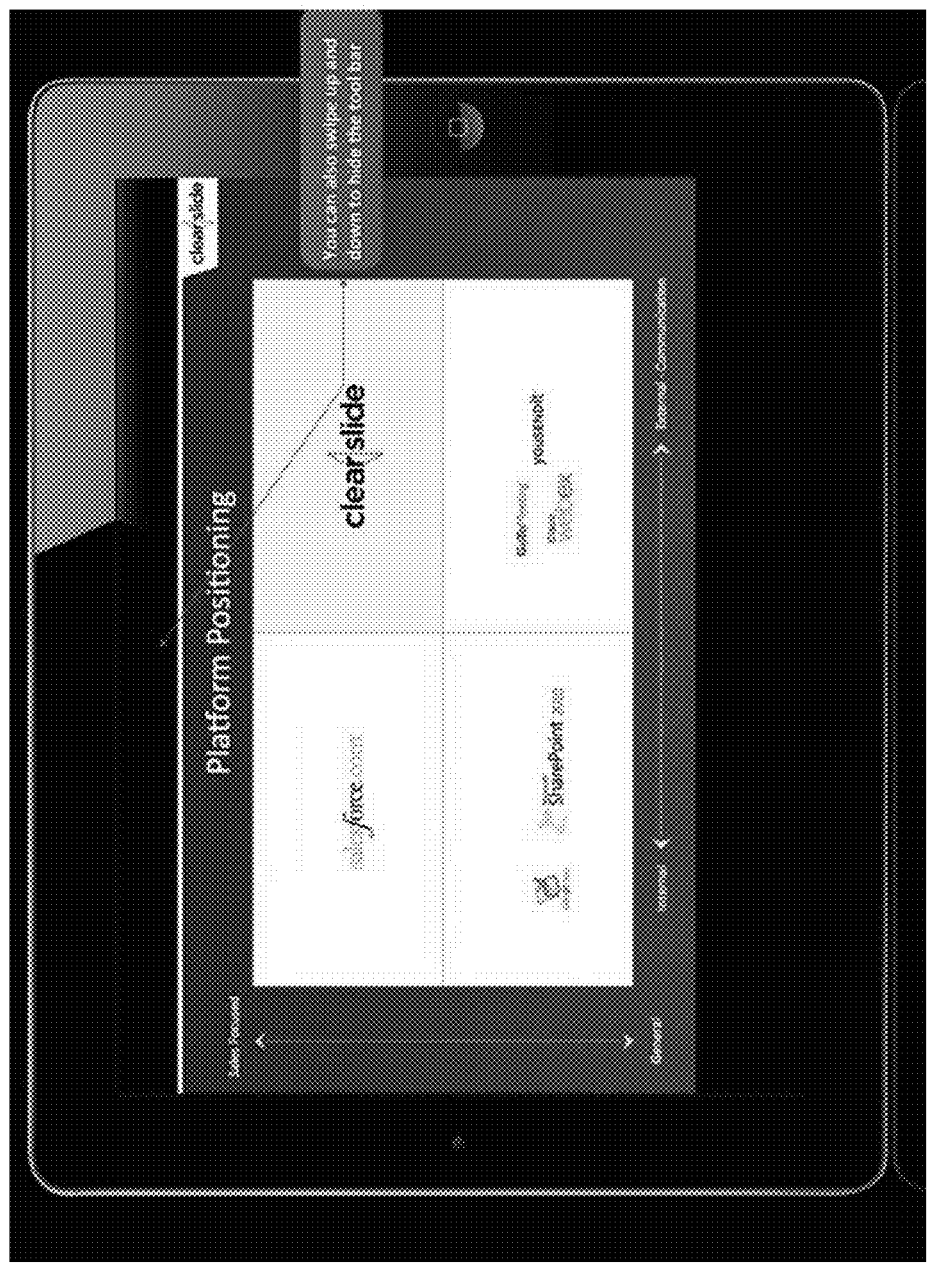
FIG. 6 shows a screen shot of a presentation slide without the top menu bar.

For example, if the presenter makes an upward swiping gesture anywhere on the touch screen of the mobile device 130, the input module 184a will cause the top menu bar (as seen in FIGS. 4 and 5, for example) to disappear so that there are fewer on-screen distractions during the presentation. FIG. 6 shows a screen shot of a presentation slide without the top menu bar. Similarly, if the presenter makes a downward swiping gesture anywhere on the touch screen, the input module 184a will make the menu bar reappear.

The presenter can also use gestures on the touch screen of the mobile device 130 to move to different slides in a presentation. For example, the presenter can swipe a hand horizontally across the screen in a first direction (e.g., left), and the input module 184a will display the next slide in the presentation. Or the presenter can swipe a hand in the opposite direction, and the input module 184a will display the previous slide in the presentation. It will be evident to a person of skill in the art that other gestures can be used instead of or in addition to the above described gestures to trigger the same responses from the input module 184a, and other gestures can be predefined that cause the input module 184a to perform other functions.

If the presenter wishes to jump to slides in a different order from how the slides are saved in memory on the mobile device 130, the presenter can select the slide preview to jump to a particular slide.

Figure 7:
FIG. 7 shows an example screen that shows how to leave a pin marker when making a presentation with the mobile device application.

During a presentation, the marker module 184b allows a presenter to place a marker on the screen by tapping the touch screen of the mobile device 130 at the location where the marker should be located. FIG. 7 shows an example screen that shows how to leave a pin marker when making a presentation. As with the input module 184a, the marker module 184b is notified by the mobile device 130 when a tap is detected on the touch screen and the location on the screen at which the tap was detected. Based on this information, the marker module 184b can place a marker at the identified location.

One embodiment of the MDA 132 includes the slide tracking engine 188 which can track data during a presentation. The slide tracking engine 188 can include a slide access module 188a which can include a timer 188b, an Internet connection module 188c, and/or an upload module 188d.

During each presentation, the slide access module 188a tracks data related to the presentation including, but not limited to, when each slide is accessed during the presentation and how long each slide is accessed and presented to the viewing audience. The slide access module 188a uses the timer 188b to determine how long each slide is accessed. Data tracked by the slide access module 188a is stored in memory on the mobile device 130.

The Internet connection module 188c determines when an Internet connection is available from the mobile device 130. In some embodiments, the Internet connection module 188c may receive information from the mobile device 130 as to when an internet connection available. At that time, the stored tracked data is uploaded by the upload module 188d to the presentation server 110, and the data is subsequently accessible by the presenter from the presentation server 110. The data may also be integrated with other analytic data for that presentation.

Figure 8:
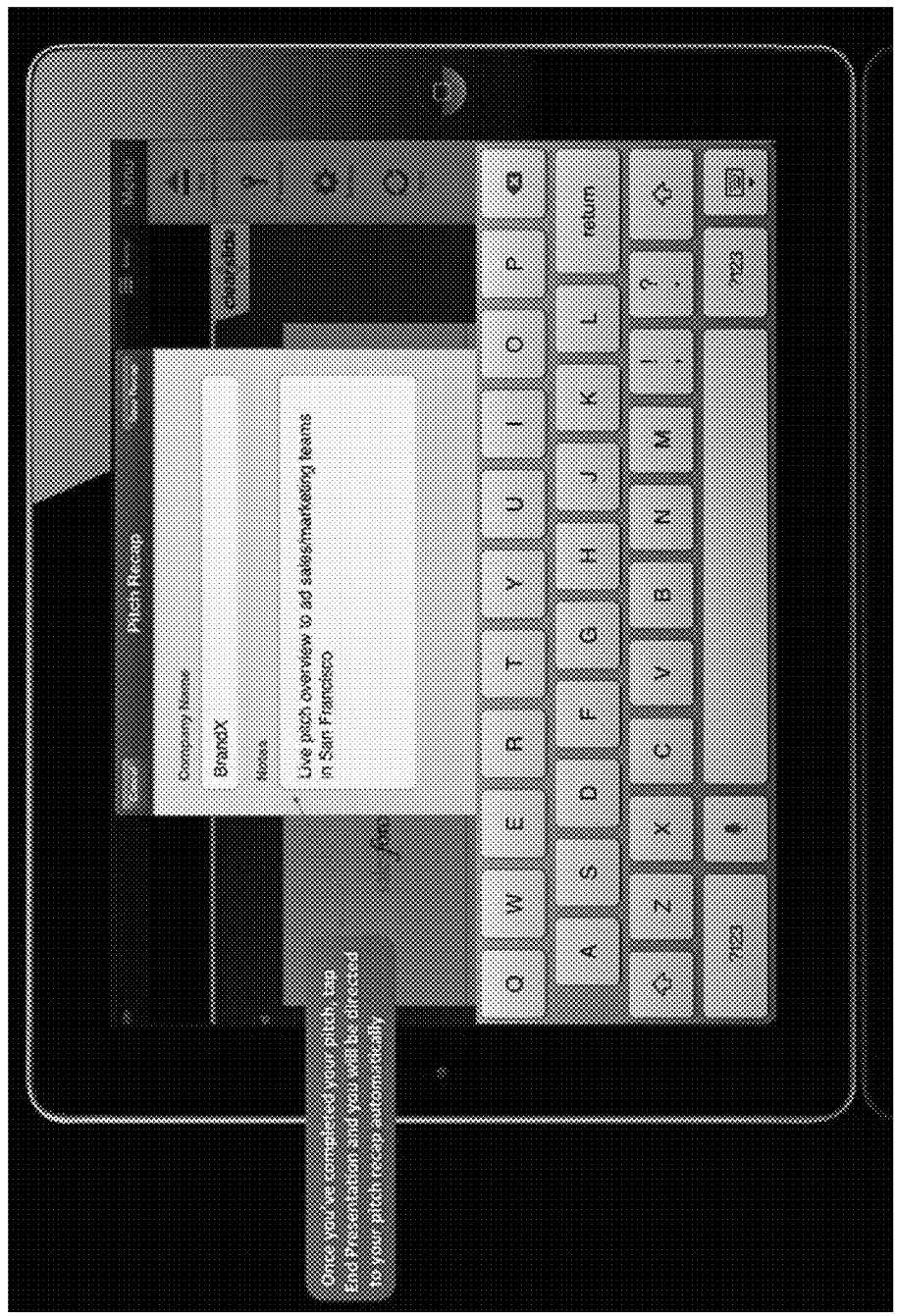
FIG. 8 shows an example screen shot of a pitch recap screen.

One embodiment of the MDA 132 includes the control module 186 which can provide user-adjustable settings for the MDA 132. At any time during or after a presentation, the presenter can select the menu icon in the menu bar to bring up the menu shown in the background on the right side of the example screen shot of FIG. 8. The menu includes an end presentation icon in the menu, as shown in the top of the menu in FIG. 8. Selecting this icon triggers the control module 186 to request that the presenter fill out a brief pitch recap, shown in the example screen shot of FIG. 8. The pitch recap prompts the presenter to enter the name of the company or audience that viewed the in-person presentation and any notes the presenter wishes to make about the presentation, for example, questions or issues brought up by the audience or action items for follow-up. The information entered by the presenter is stored by the control module 186 on the mobile device 130.

When there is an internet connection available as determined by the Internet connection module 188c, the upload module 188d uploads the pitch recap to the presentation server 110, and the pitch recap is subsequently accessible by the presenter from the presentation server 110.

Figure 9:
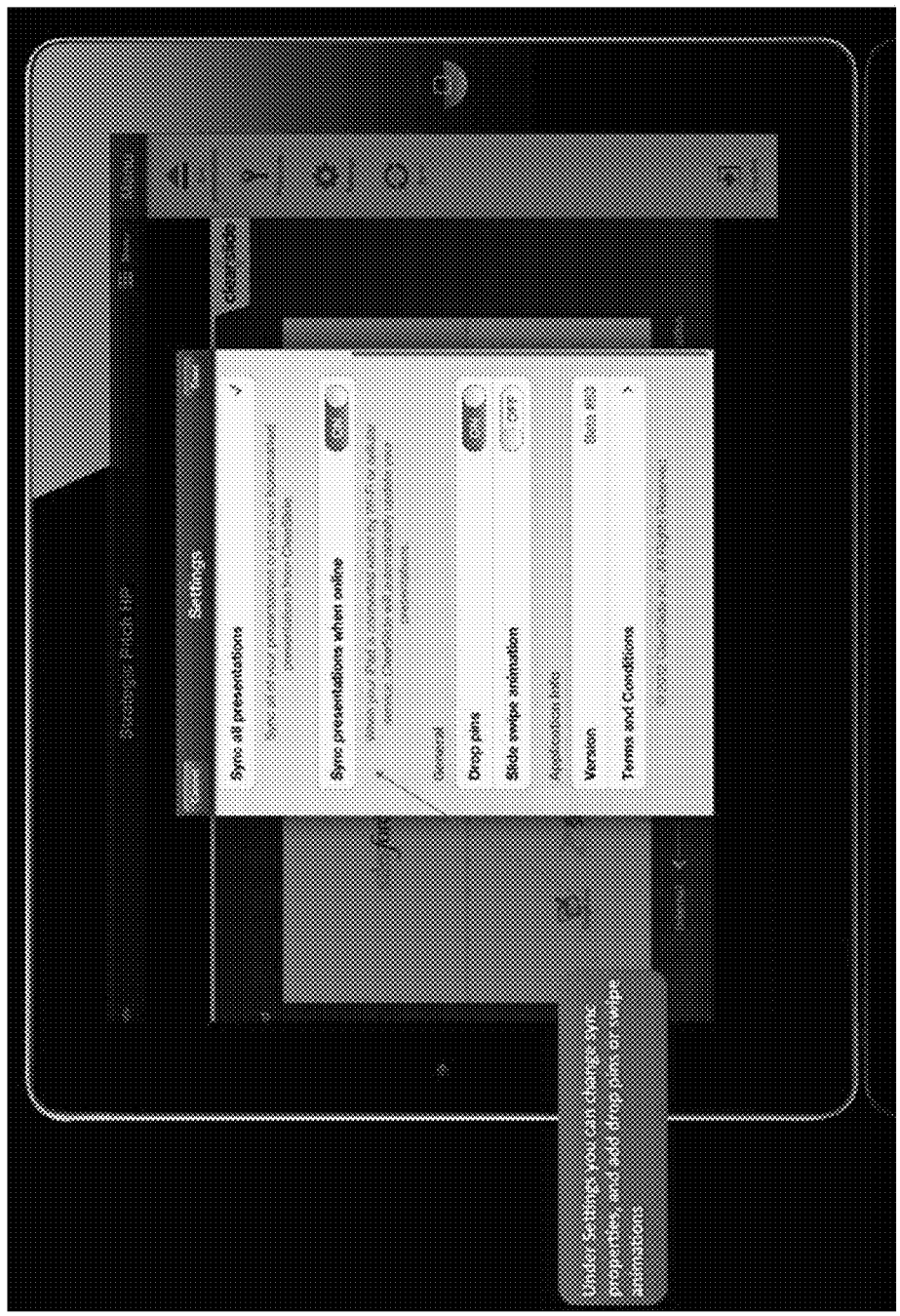
FIG. 9 shows an example screen shot displaying user interface settings.

The control module 186 also provides several optional user interface settings to the presenter, as shown in the example screen shot of FIG. 9. In one embodiment, the presenter can modify the synchronization settings to automatically synchronize either all of the presenter's presentations that have been uploaded to the presentation server, or just certain bookmarked presentations.

In one embodiment, the presenter can select an option to automatically synchronize presentations whenever there is internet connection available, either Wi-Fi or cellular.

In one embodiment, the ability to drop pins or markers when the presenter taps the screen during a presentation can be turned on or off.

In one embodiment, the presenter can select to turn on or off a slide swipe animation during the presentation that shows the current slide sliding off the screen and the next slide sliding onto the screen. If the animation is turned off, the slides are not shown sliding on and off the screen, rather the screen just changes from one screen to the next.

Figure 10:
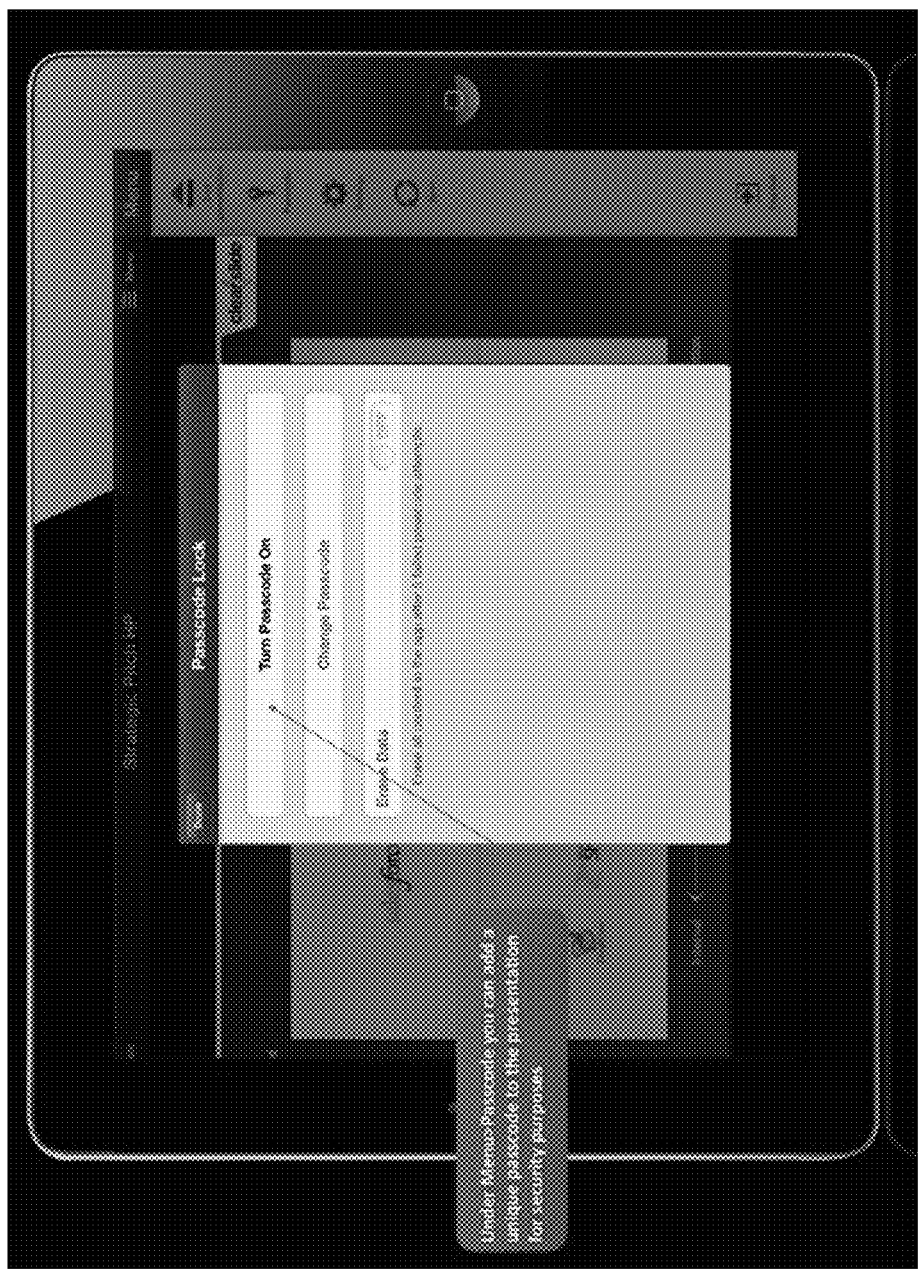
FIG. 10 shows an example screen shot for turning the pass code for the mobile device application on or off.

In one embodiment, the presenter can set a passcode for the MDA 132 and choose to turn the passcode on or off, as shown in the example screen shot of FIG. 10. If the passcode is on, a user must enter the correct passcode to access the MDA 132. The presenter can also be provided with an option to erase the content saved to memory by the MDA 132 if an incorrect passcode is entered more than a selectable number of times.

In one embodiment, if the MDA 132 has access to an internet connection, the MDA 132 can provide the functionalities associated with presenting a live pitch, for example, allowing other viewers to join the presentation through their computers. Thus, both viewers in a live audience in the same room as the presenter and viewers connected by computer to the live pitch can view the presentation.

Figure 11:
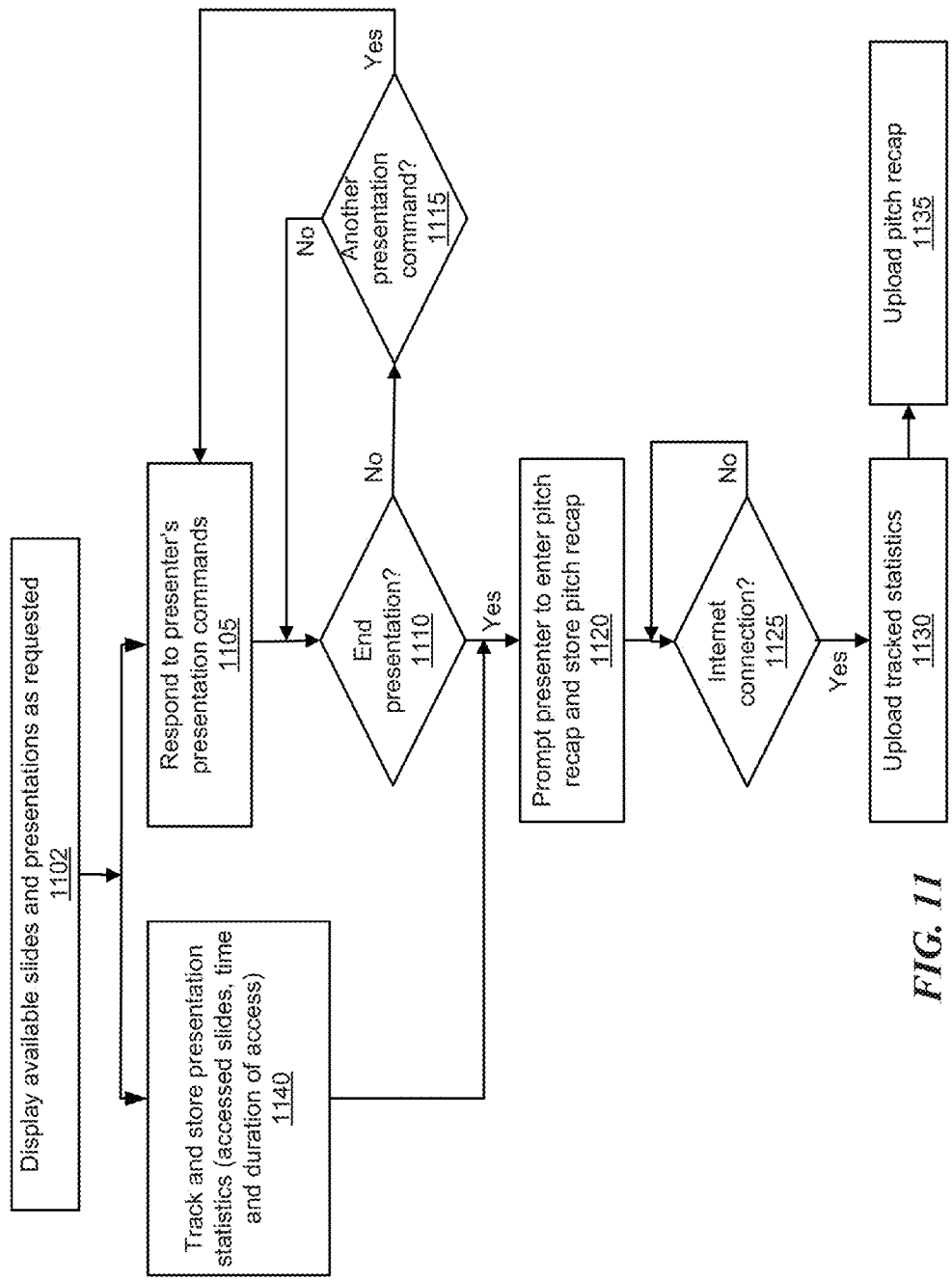
FIG. 11 is a flow diagram illustrating an example process of presenting a presentation from a mobile device.

FIG. 11 is a flow diagram illustrating an example process of presenting a presentation from a mobile device.

At block 1102, the mobile device application responds to a presenter's commands to display slides from one or more presentations that have previously been downloaded to the memory of the mobile device from the presentation server. Then the flow splits into two parallel paths.

In one path, at block 1105, the MDA responds to the presenter's presentation commands. Non-limiting examples of presentation commands include jumping to a selected slide or selected presentation for display, displaying the next or previous slide in the current presentation, showing a marker in a specified location on the display, and making a menu bar appear or disappear.

At decision block 1110, the MDA determines whether the presenter has issued an end presentation command. If no end presentation command is received (block 1110—No), at decision block 1115, the MDA determines whether another presentation command has been issued by the presenter. If no presentation command is received, the process returns to decision block 1110. If a presentation command is received, the process returns to block 1105.

In parallel to the first path, at block 1140, the MDA tracks and stores presentation data, such as accessed slides, and time and duration of access of each slide. This path continues to block 1120 when the presentation has ended.

If an end presentation command is received (block 1110—Yes), at block 1120, the MDA prompts the presenter to enter a pitch recap and stores the information for the pitch recap. Information in the pitch recap can include the name of the company or audience members who viewed the presentation, notes about the presentation, and action items to be performed regarding the presentation.

Then at decision block 1125, the MDA determines if there is an Internet connection available from the mobile device to the presentation server. If there is no connection available (block 1125—No), the process remains at decision block 1125 waiting for a connection. If there is a connection (block 1125—Yes), at block 1130, the MDA uploads the tracked presentation data to the presentation server. And at block 1335 the MDA also uploads the pitch recap to the presentation server.

Figure 12:
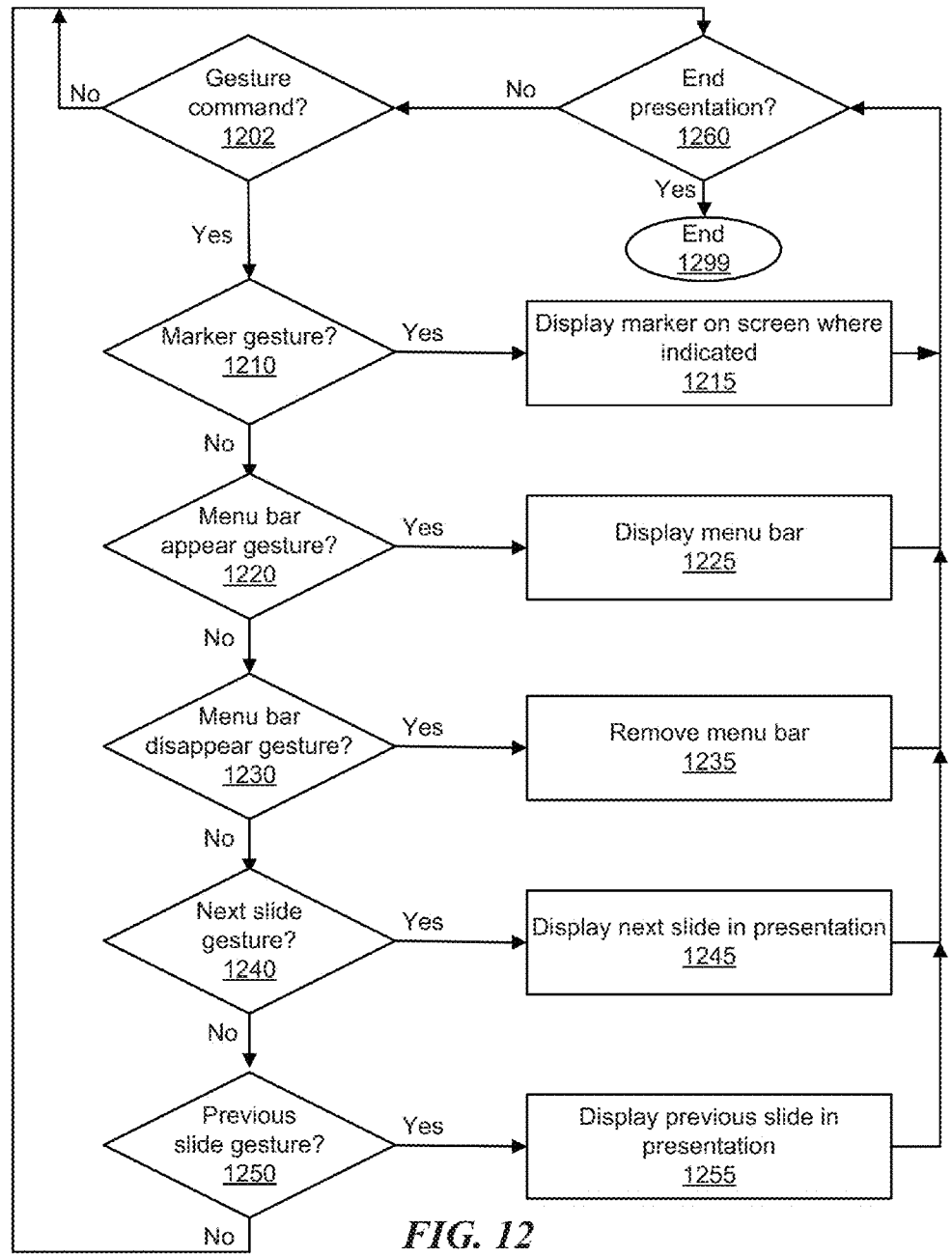
FIG. 12 is a flow diagram illustrating an example process of responding to touch screen input received from the presenter the mobile device.

FIG. 12 is a flow diagram illustrating an example process of responding to touch screen input received from the presenter via the mobile device. At decision block 1202, the MDA determines if a gesture command has been received from the presenter via the touch screen of the mobile device. If no command has been received (block 1202—No), at block 1260, the MDA determines whether an end presentation command has been issued by the presenter. If an end presentation command is received (block 1260—Yes), the process ends at block 1299.

If an end presentation command has not been received (block 1260—No), the process returns to decision block 1202. If a gesture command has been received (block 1202—Yes), at decision block 1210, the MDA determines whether a marker gesture, such as a tap on the mobile device touch screen, has been performed by the presenter. If there has been a marker gesture (block 1210—Yes), at block 1215, the MDA displays a marker on the screen where the presenter indicated with the marker gesture, and the process returns to decision block 1260.

If no gesture marker has been made (block 1210—No), at decision block 1220, the MDA determines whether the presenter has performed a menu bar appear gesture, such as a downward swipe on the mobile device touch screen. If a menu bar appear gesture has been made (block 1220—Yes), at block 1225, the MDA displays the menu bar on the screen, and the process returns to decision block 1260.

If a menu bar appear gesture has not been made (block 1220—No), at decision block 1230, the MDA determines whether the presenter has performed a menu bar disappear gesture, such as an upward swipe on the mobile device touch screen. If a menu bar disappear gesture has been made (block 1230—Yes), at block 1235, the MDA removes the menu bar from the screen, and the process returns to decision block 1260.

If a menu bar disappear gesture has not been made (block 1230—No), at decision block 1240, the MDA determines whether the presenter has performed a next slide gesture, such as a sideways swipe to the left on the mobile device touch screen. If a next slide gesture has been made (block 1240—Yes), at block 1245, the MDA displays the next slide in the currently accessed presentation, and the process returns to decision block 1260.

If a next slide gesture has not been made (block 1240—No), at decision block 1250, the MDA determines whether the presenter has performed a previous slide gesture, such as a sideways swipe to the right on the mobile device touch screen. If a previous slide gesture has been made (block 1250—Yes), at block 1255, the MDA displays the previous slide in the currently accessed presentation, and the process returns to decision block 1260.

If a previous slide gesture has not been made (block 1250—No), the process returns to decision block 1260.

Figure 13:
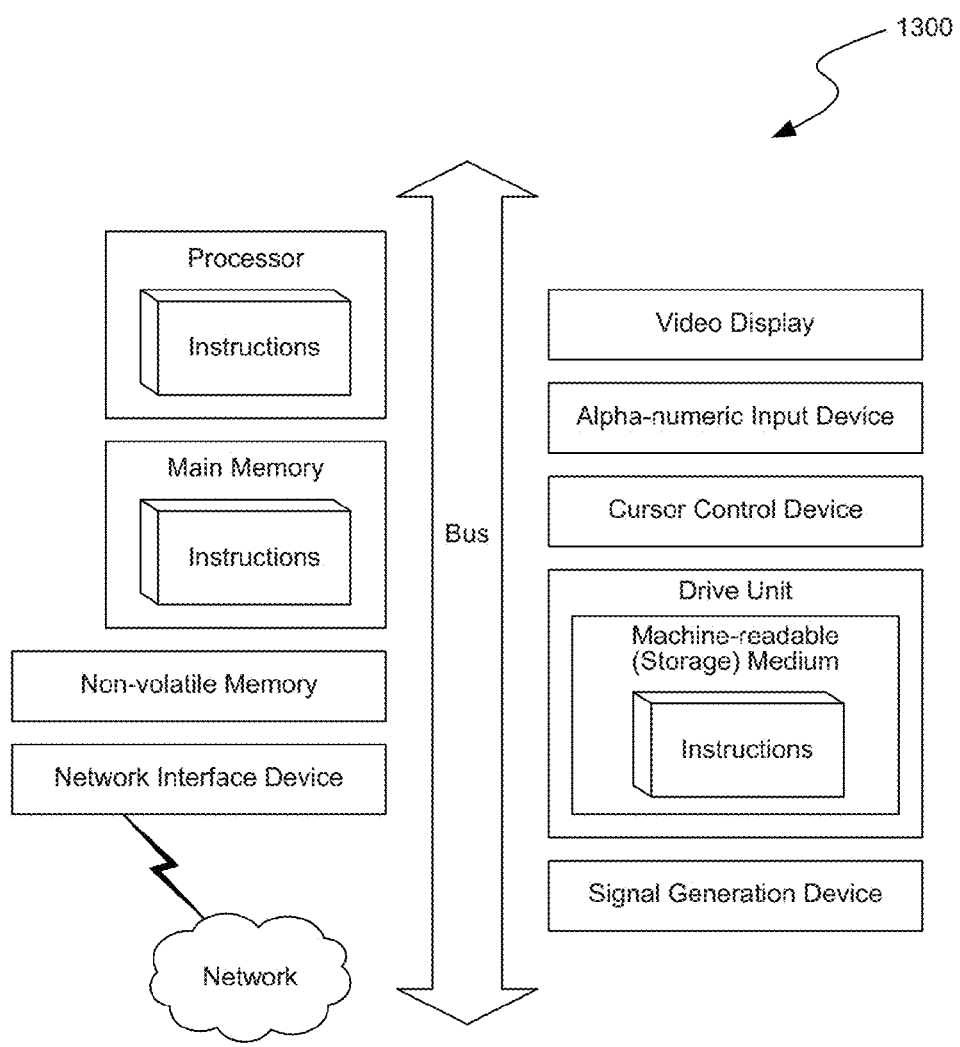
FIG. 13 is a block diagram showing an example of the architecture for a system that can be used to make a presentation from a mobile device.

FIG. 13 shows a diagrammatic representation of a machine 1300 in the example form of a mobile computer system within which a set of instructions, for causing the machine to perform any one or more of the methodologies discussed herein, may be executed In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a user device, a tablet PC, a laptop computer, a set-top box (STB), a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The network interface device enables the machine 1300 to mediate data in a network with an entity that is external to the host server, through any known and/or convenient communications protocol supported by the host and the external entity. The network interface device can include one or more of a network adaptor card, a wireless network interface card, a router, an access point, a wireless router, a switch, a multi-layer switch, a protocol converter, a gateway, a bridge, bridge router, a hub, a digital media receiver, and/or a repeater.

The network interface device can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

CONCLUSION

Unless the context clearly requires otherwise, throughout the description and the claims, the words "comprise," "comprising," and the like are to be construed in an inclusive sense (i.e., to say, in the sense of "including, but not limited to"), as opposed to an exclusive or exhaustive sense. As used herein, the terms "connected," "coupled," or any variant thereof means any connection or coupling, either direct or indirect, between two or more elements. Such a coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. While processes or blocks are presented in a given order in this application, alternative implementations may perform routines having steps performed in a different order, or employ systems having blocks in a different order. Some processes or blocks may be deleted, moved, added, subdivided, combined, and/or modified to provide alternative or subcombinations. Also, while processes or blocks are at times shown as being performed in series, these processes or blocks may instead be performed or implemented in parallel, or may be performed at different times. Further any specific numbers noted herein are only examples. It is understood that alternative implementations may employ differing values or ranges.

The various illustrations and teachings provided herein can also be applied to systems other than the system described above. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts included in such references to provide further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

While certain aspects of the invention are presented below in certain claim forms, the applicant contemplates the various aspects of the invention in any number of claim forms. For example, while only one aspect of the invention is recited as a means-plus-function claim under 35 U.S.C. §112, sixth paragraph, other aspects may likewise be embodied as a means-plus-function claim, or in other forms, such as being embodied in a computer-readable medium. (Any claims intended to be treated under 35 U.S.C. §112, ¶6 will begin with the words "means for.") Accordingly, the applicant reserves the right to add additional claims after filing the application to pursue such additional claim forms for other aspects of the invention.

We claim:

1. A computer-implemented method of enabling a mobile device to present a presentation when the mobile device is not online while keeping statistical data pertaining to the presentation tracked by a presentation server current, the presentation server operable to transmit a sequence of slides of the presentation to a viewer's device in response to the presenter controlling the sequence, the method comprising:

receiving, at the mobile device, log-in information from a presenter for a presenter's account;
when detecting that the mobile device is communicatively coupled to the presentation server:
transmitting the log-in information to the presentation server; and
automatically synchronizing, by downloading from the presentation server a latest version of, one or more presentations stored locally on the mobile device with corresponding presentations stored on the presentation server and associated with the presenter's account;
when detecting that the mobile device is not communicatively coupled to the presentation server:
enabling, via the mobile device, the presenter to select a one presentation from the one or more presentations stored locally on the mobile device;
responsive to a presenter's selection of the one presentation, starting presentation of the one presentation by causing one or more slides of the one presentation to be displayed via the mobile device, wherein a sequence of displaying the one or more slides of the one presentation is controlled by inputs from the presenter at the mobile device;
during the one or more slides from the one presentation being displayed, tracking slide access analytic data pertaining to said started presentation until an end of the presentation is detected;
storing the slide access analytic data locally on the mobile device; and
in response to said storing the slide access analytic data and upon detecting that the mobile device is communicatively coupled to the presentation server, uploading the slide access analytic data to the presentation server so as to enable the presentation server to record the slide access analytic data for the one or more slides of the one presentation as if the presentation were performed through the presentation server;
detecting, at the mobile device during the presentation, touch screen input from the presenter;
adjusting a display coupled to the mobile device responsive to the touch screen input; and
if the touch screen input comprises a next slide gesture or a previous slide gesture, selectively generating a slide swipe animation that corresponds to the touch screen input based on a preference set at the mobile device.

2. The method of claim 1, further comprising:
transmitting, from the mobile device to the presentation server, a preference parameter indicating which one or more of the corresponding presentations stored on the presentation server and associated with the presenter's account are to be synchronized with the mobile device.

3. The method of claim 1, wherein presentations downloaded from the presentation server comprise presentation items that are converted by the presentation server from presentation files uploaded to the presentation server under the presenter's account, the presentation items including presentation images that represent slides in the presentation files.

4. The method of claim 1, further comprising permitting access to the one presentation on the mobile device only upon receiving a pre-designated access code for the one presentation.

5. The method of claim 1, further comprising:
upon detecting the end of the presentation, prompting the presenter to enter a pitch recap; and
upon detecting an internet connection, uploading the pitch recap to the presentation server.

6. The method of claim 5, further comprising causing to be displayed a menu bar including an end presentation icon, wherein detection of the end of the first presentation comprises detection of a selection of the end presentation icon.

7. The method of claim 1, wherein the touch screen input comprises a marker gesture and a location of the marker gesture on a screen of the mobile device, and further wherein adjusting the display comprises providing a marker on the display at the location of the marker gesture.

8. The method of claim 1, wherein the touch screen input comprises a menu bar manipulation gesture, and further wherein adjusting the display comprises displaying or removing a menu bar.

9. The method of claim 1, wherein the touch screen input comprises a next slide gesture, and further wherein adjusting the display comprises displaying a next slide in the one presentation.

10. The method of claim 1, wherein the touch screen input comprises a previous slide gesture, and further wherein adjusting the display comprises displaying a previous slide in the one presentation.

11. The method of claim 1, further comprising providing a preview of selected slides for the one presentation.

12. The method of claim 1, wherein slide access analytic data include a total amount of time for each slide from the first presentation.

13. A non-transitory storage medium storing instructions which when executed by a mobile device processor, cause the mobile device processor to:
receive, at the mobile device, log-in information from a presenter for a presenter's account;
when detecting that the mobile device is communicatively coupled to the presentation server:
transmit the log-in information to the presentation server; and
automatically synchronize, by downloading from the presentation server a latest version of, one or more presentations stored locally on the mobile device with corresponding presentations stored on the presentation server and associated with the presenter's account;
when detecting that the mobile device is not communicatively coupled to the presentation server:
enable, via the mobile device, the presenter to select a one presentation from the one or more presentations stored locally on the mobile device;
responsive to a presenter's selection of the one presentation, start presentation of the one presentation by causing one or more slides of the one presentation to be displayed via the mobile device, wherein a sequence of displaying the one or more slides of the one presentation is controlled by inputs from the presenter at the mobile device;
during the one or more slides from the one presentation being displayed, track slide access analytic data pertaining to said started presentation until an end of the presentation is detected; and
store the slide access analytic data locally on the mobile device; and
in response to said storing the slide access analytic data and upon detecting that the mobile device is communicatively coupled to the presentation server, upload the slide access analytic data to the presentation server so as to enable the presentation server to record the slide access analytic data for the one or more slides of the one presentation as if the presentation were performed through the presentation server;

detect, at the mobile device during the presentation, touch screen input from the presenter;

adjust a display coupled to the mobile device responsive to the touch screen input; and if the touch screen input comprises a next slide gesture or a previous slide gesture, selectively generate a slide swipe animation that corresponds to the touch screen input based on a preference set at the mobile device.

14. The non-transitory storage medium of claim 13, further causing the mobile device processor to:

transmit, from the mobile device to the presentation server, a preference parameter indicating which one or more of the corresponding presentations stored on the presentation server and associated with the presenter's account are to be synchronized with the mobile device.

15. The non-transitory storage medium of claim 13, further causing the mobile device processor to:

permit access to the one presentation on the mobile device only upon receiving a pre-designated access code for the one presentation.

* * * * *